US010543452B2

(12) United States Patent
Fillatre et al.

(10) Patent No.: US 10,543,452 B2
(45) Date of Patent: Jan. 28, 2020

(54) REMOVAL OF AROMATIC HYDROCARBONS FROM LEAN ACID GAS FEED FOR SULFUR RECOVERY

(71) Applicant: PROSERNAT, Puteaux (FR)

(72) Inventors: Emile Fillatre, Marly le Roi (FR); Gauthier Perdu, Suresnes (FR); Benoit Mares, Montesson (FR)

(73) Assignee: PROSERNAT, Puteaux (FR)

( * ) Notice: Subject to any disclaimer, the term of this patent is extended or adjusted under 35 U.S.C. 154(b) by 0 days.

(21) Appl. No.: 15/570,645

(22) PCT Filed: Apr. 28, 2016

(86) PCT No.: PCT/EP2016/059461
§ 371 (c)(1),
(2) Date: Oct. 30, 2017

(87) PCT Pub. No.: WO2016/174120
PCT Pub. Date: Nov. 3, 2016

(65) Prior Publication Data
US 2018/0290100 A1 Oct. 11, 2018

Related U.S. Application Data (63) Continuation-in-part of application No. 14/700,974, filed on Apr. 30, 2015, now abandoned.

(30) Foreign Application Priority Data

Apr. 30, 2015 (EP) .................................... 15305667

(51) Int. Cl.
*B01D 53/14* (2006.01)
*C01B 17/04* (2006.01)
*C10L 3/10* (2006.01)

(52) U.S. Cl.
CPC ..... *B01D 53/1418* (2013.01); *B01D 53/1406* (2013.01); *B01D 53/1468* (2013.01);
(Continued)

(58) Field of Classification Search
None
See application file for complete search history.

(56) References Cited

U.S. PATENT DOCUMENTS 4,025,322 A    5/1977   Edwin
4,192,857 A *   3/1980   Tellier ...................... B01J 35/10
                                                                                                    423/219
(Continued)

FOREIGN PATENT DOCUMENTS

EP         2402068 A1    1/2012
WO    2014006077 A1    1/2014

OTHER PUBLICATIONS

International Search Report for PCT/EP2016/059461 dated Jun. 27, 2016.
(Continued)

*Primary Examiner* — Anita Nassiri-Motlagh
(74) *Attorney, Agent, or Firm* — Millen, White, Zelano and Branigan, P.C.

(57) ABSTRACT

The present invention is directed to a process for the removal of aromatic hydrocarbons from a lean acid gas containing less than 20 mol. % of $H_2S$, comprising:
    a) contacting the lean acid gas stream (1) with a $H_2S$-selective liquid absorbent solution (29) in a first absorption zone (2) to produce a gas stream depleted in $H_2S$ (3) and an absorbent solution enriched in $H_2S$ (4),
    b) introducing the absorbent solution (4) into a non-thermic stripping zone (8) where it is contacted with a stripping gas stream (7) to obtain an absorbent solution depleted in $C_4^+$ aliphatic and aromatic hydrocarbons
(Continued)

(9) and a stripping gas stream enriched in aromatic and $C_4^+$ aliphatic hydrocarbons (10), c) contacting the stripping gas stream (10) obtained in step b) with a $H_2S$-selective liquid absorbent solution (28) in a second absorption zone (12) to obtain a stripping gas stream depleted in $H_2S$ (13), and an absorbent solution enriched in $H_2S$ (14)

d) introducing the absorbent solution (9) obtained in step b) into a desorption zone (16) wherein the $H_2S$-selective liquid absorbent solution (17) is recovered and a lean acid gas is produced.

18 Claims, 2 Drawing Sheets (52) U.S. Cl.
CPC ........ *B01D 53/1487* (2013.01); *C01B 17/043* (2013.01); *C01B 17/0408* (2013.01); *C01B 17/0417* (2013.01); *C10L 3/103* (2013.01); *C10L 3/104* (2013.01); *B01D 2252/20431* (2013.01); *B01D 2252/20489* (2013.01); *B01D 2252/602* (2013.01); *C10L 2290/12* (2013.01); *C10L 2290/541* (2013.01)

(56) References Cited

U.S. PATENT DOCUMENTS

| | | |
|---|---|---|
| 7,635,408 B2 | 12/2009 | Mak et al. |
| 2002/0007733 A1 | 1/2002 | Morrow |
| 2004/0118126 A1 | 6/2004 | Ong |
| 2008/0019899 A1 | 1/2008 | Mak et al. |
| 2015/0144840 A1 | 5/2015 | Valenzuela |

OTHER PUBLICATIONS

Morrow, D. C. et al., "Removal and Disposal of BTEX Compounds from Amine Plant Acid Gas Streams," Proceedings of the Seventy-Sixth GPA Annual Convention, Tulsa, OK: Gas Processors Association, 1997, pp. 171-173.

Bullin, J. A. et al., "Hydrocarbons and BTEX Pickup and Control From Amine Systems," Presented at the 83rd Annual GPA Convention—Mar. 15, 2004.

Crevier, P. P. et al., "Activated Carbon Eliminates Claus Deactivated Problem," Oil & Gas Journal, Oct. 22, 2007, pp. 60-66.

\* cited by examiner

REMOVAL OF AROMATIC HYDROCARBONS FROM LEAN ACID GAS FEED FOR SULFUR RECOVERY

The present invention relates to a process for the removal of aromatic hydrocarbons, such as benzene, toluene, ethyl benzene and xylene (BTX) and aliphatic hydrocarbons having 4 carbon atoms or more ($C_4^+$) from a lean acid gas containing $CO_2$ and less than 20 mol. % of $H_2S$ prior to sulfur recovery.

BACKGROUND OF THE INVENTION

Natural gas, as it is captured from naturally occurring deposits, is composed primarily of light aliphatic hydrocarbons such as methane, propane, butane, pentane, and their isomers. Certain contaminants are naturally present in the gas, and must be removed prior to delivery of the purified gas for private use or commercial conditioning. These contaminants include aliphatic hydrocarbons having 4 carbon atoms or more ($C_4^+$) and aromatic hydrocarbons such as benzene, toluene, ethyl benzene and xylenes collectively referred to as "BTX", but more importantly acid components such as hydrogen sulfide ($H_2S$) and carbon dioxide ($CO_2$).

The presence of hydrogen sulfide in industrial gases causes significant environmental problems and is detrimental to the plant structure, requiring constant maintenance. Strict requirements are therefore in place to remove $H_2S$ from gas streams, in particular in natural gas plants.

Removal and disposal of $H_2S$ from natural gas is customarily accomplished by contacting the natural gas containing the $H_2S$ with a liquid amine solvent at the pressure of the natural gas, which is usually from 40 to 100 bar (considered "high pressure"), thus having the $H_2S$ adsorbed by the amine solvent. Carbon dioxide ($CO_2$), aromatic hydrocarbons and $C_4^+$ aliphatic hydrocarbons are simultaneously adsorbed by the amine solvent due to the high pressure maintained during the absorption of $H_2S$. A "sweet" or purified natural gas meeting environmental standards is thus obtained and an amine containing most of the contaminants ($CO_2$, $H_2S$, aromatic hydrocarbons and $C_4^+$ aliphatic hydrocarbons) is recovered. The contaminated amine solvent is then carried to a regeneration zone where it is recovered under elevated temperature (generally about 130° C.) and low pressure conditions (generally about 2 to 3 barA). An acid gas containing $CO_2$, $H_2S$, aromatic hydrocarbons and $C_4^+$ aliphatic hydrocarbons is also obtained.

The presence of $H_2S$ in the acid gas obtained after purification of natural gas remains problematic and sulfur recovery units (SRU) are thus installed to convert poisonous sulfur compounds, as $H_2S$, into harmless elemental sulfur.

A widespread method for desulfurization of $H_2S$-containing gas streams is the Claus process which operates in two major process steps. The first process step is carried out in a furnace where hydrogen sulfide is converted to elemental sulfur and sulfur dioxide at temperatures of approximately 1100 to 1400° C. by the combustion of about one third of the hydrogen sulfide in the gas stream. The so obtained sulfur dioxide reacts with hydrogen sulfide in the furnace to elemental sulfur by Claus reaction. Thus, in this first step of the Claus process, about 60 to 70% of the $H_2S$ in the feed gas are converted and most of the aromatic and $C_4^+$ aliphatic hydrocarbons are eliminated.

To achieve higher sulfur recovery rates, at least one catalytic step follows where the Claus reaction according to Eq. 1:

$$2H_2S+SO_2 \leftrightarrow 3/xS_x+2H_2O \qquad \text{Eq. 1}$$

continues.

The Claus process is very well adapted to acid gas feeds containing more than 55 mol. % of $H_2S$ where the first combustion step operated at a temperature higher than 1200° C. can be fully conducted thus converting 60 to 70% of $H_2S$ and simultaneously destroying the aromatic hydrocarbons and $C_4^+$ aliphatic hydrocarbons. However, recovering sulfur from an acid gas feed containing less than 55 mol. % of $H_2S$ applying the Claus process happens to be more complicated: the first combustion step cannot be conducted at sufficiently elevated temperatures or cannot be conducted at all due to the presence of significant amounts of $CO_2$ in the feed that cools down the combustion reaction below 1100° C. or even inhibits the combustion reaction when the content of $CO_2$ exceeds 85%. This allows the aromatic hydrocarbons and $C_4^+$ aliphatic hydrocarbons to avoid combustion in the first thermal step of the Claus process and to pass unreacted in the catalytic step. These aromatic hydrocarbons and $C_4^+$ aliphatic hydrocarbons are however harmful to the installed unit because they deactivate the catalysts operated in the catalytic step of the Claus process. This results in poor sulfur recovery and frequent catalyst replacement.

Several methods have been investigated in order to remove aromatic hydrocarbons and $C_4^+$ aliphatic hydrocarbons from lean acid gas feeds containing less than 55 mol. % of $H_2S$ to make them suitable for sulfur plants. For example, acid gas enrichment (AGE) processes where the lean acid gas (obtained from the regeneration zone generally operated at about 130° C. and 2 to 3 barA), is treated in an absorber at its pressure of 3 barA (considered "low pressure") using a selective solvent can be performed. Due to the "low pressure" operated in the AGE, the solvent preferentially absorbs $H_2S$ over $CO_2$, and much lower levels of aromatic hydrocarbons and $C_4^+$ aliphatic hydrocarbons. After regeneration of the solvent, an acid gas enriched in $H_2S$ and depleted $CO_2$, aromatic hydrocarbons and $C_4^+$ aliphatic hydrocarbons is obtained. AGE processes is usually selected when it can increase the $H_2S$ content in the acid gas over 55 vol. % allowing the obtained acid gas to be treated conventionally by Claus, with treatment in a Claus furnace at temperatures higher than 1100° C., thus eliminating the aromatic hydrocarbons and $C_4^+$ aliphatic hydrocarbons prior to the Claus catalytic step. Application EP2402068 for example discloses the treatment of acid gases with two absorption steps. In this process, the solvent enriched in $H_2S$ obtained from the first absorption zone is sent to a desorption zone where heat is supplied to desorb $H_2S$ and promote formation of $H_2S$-enriched gas. A portion of this of $H_2S$-enriched gas is then sent to another $H_2S$ absorption zone for further enrichment. AGE however can be found unsatisfactory when the initial concentration of $H_2S$ in the acid gas is too low (usually less than 20 mol. %) to reach a concentration higher than 55 mol. % of $H_2S$ after enrichment.

Another proposed solution for aromatic and $C_4^+$ aliphatic hydrocarbons removal is the gas stripping process, conventionally fuel gas stripping, of a rich amine solvent obtained from "high pressure" sour natural gas absorber before its regeneration. The fuel gas stream will strip off the aromatic and $C_4^+$ aliphatic hydrocarbons of the lean acid gas and an amine solvent depleted in aromatic and $C_4^+$ aliphatic hydrocarbons will thus be obtained. The fuel gas containing the aromatic and $C_4^+$ aliphatic hydrocarbons will be used as a combustible for an incinerator or a utility boiler where the pollutants will be destructed. However, in such gas stripping processes, the removal of the aromatic and $C_4^+$ aliphatic hydrocarbons from the rich amine is a function of stripping fuel gas flow rate: the higher the fuel gas flowrate, the more removal can be achieved. The fuel gas, however, is used in the unit as a feed for an incinerator and/or utility boilers and, its flowrate thus remains limited by the demand of the incinerator or utility boilers. In order to properly remove the aromatic and $C_4^+$ aliphatic hydrocarbons, it could be necessary to use important amounts of fuel gases, much higher than what would be necessary to run the incinerator and/or utility boilers. This would thus result in high waste of fuel gas, particularly when the content of aromatics and aliphatic hydrocarbons is high in rich amine solvent obtained from "high pressure" sour natural gas absorber. In this context, the fuel gas stripping would not provide a satisfactory solution to the problem of aromatic and $C_4^+$ aliphatic hydrocarbons removal from lean acid gas prior to sulfur recovery.

A further option considered in industry is the adsorption of the aromatic hydrocarbons and $C_4^+$ aliphatic hydrocarbons from the acid gas in regenerable activated carbon beds or molecular sieves. Although technically feasible, these processes however remain costly due to the necessary regeneration cycles of the carbon beds and the difficulties to valorize the products issued from these regenerations due to the presence of pollutants such as $H_2S$.

Thus, there remains a need for a process that efficiently removes aromatic hydrocarbons, such as benzene, toluene, ethyl benzene and xylene (BTX) and aliphatic hydrocarbons having 4 carbon atoms or more ($C_4^+$) from a lean acid gas containing less than 20 mol. % of $H_2S$ prior to sulfur recovery, when AGE cannot achieve sufficient $H_2S$ enrichment.

The object of the present invention a process for the removal of aromatic hydrocarbons, such as benzene, toluene, ethyl benzene and xylene (BTX) and aliphatic hydrocarbons having 4 carbon atoms or more ($C_4^+$) from a lean acid gas containing $CO_2$ and less than 20 mol. % of $H_2S$, which process comprises:

a) contacting the lean acid gas stream (1) with a $H_2S$-selective liquid absorbent solution (29) in a first absorption zone (2) to produce a gas stream depleted in $H_2S$ (3) and containing $CO_2$, aromatic hydrocarbons and $C_4^+$ aliphatic hydrocarbons, and an absorbent solution enriched in $H_2S$ (4), also containing co-absorbed $C_4^+$ aliphatic hydrocarbons, aromatic hydrocarbons and $CO_2$, b) introducing the absorbent solution enriched in $H_2S$ (4) into a non-thermic stripping zone (8) where it is contacted with a stripping gas stream (7), preferably fuel gas, to obtain an absorbent solution depleted in $C_4^+$ aliphatic hydrocarbons and aromatic hydrocarbons (9) and containing $H_2S$ and $CO_2$ and a stripping gas stream enriched in aromatic hydrocarbons and $C_4^+$ aliphatic hydrocarbons (10), also containing $H_2S$ and $CO_2$, c) contacting the stripping gas stream enriched in aromatic hydrocarbons and $C_4^+$ aliphatic hydrocarbons (10), also containing $H_2S$ and $CO_2$ obtained in step b) with a $H_2S$-selective liquid absorbent solution (28) in a second absorption zone (12) to obtain a stripping gas stream depleted in $H_2S$ and containing aromatic hydrocarbons, $C_4^+$ aliphatic hydrocarbons and $CO_2$ (13), and an absorbent solution enriched in $H_2S$ (14) also containing co-absorbed aromatic hydrocarbons, $C_4^+$ aliphatic hydrocarbons and $CO_2$, said $H_2S$-selective liquid absorbent solution being preferably identical to that used in step a), d) introducing the absorbent solution depleted in $C_4^+$ aliphatic hydrocarbons and aromatic hydrocarbons (9) obtained in step b) into a desorption zone (16) wherein the $H_2S$-selective liquid absorbent solution (17) is recovered and a lean acid gas containing $H_2S$ and $CO_2$, depleted in $C_4^+$ aliphatic hydrocarbons and aromatic hydrocarbons (21) is produced.

The invention is also directed to a process for sulfur recovery from a lean acid gas containing $CO_2$ and less than 20 mol. % of $H_2S$, which process comprises:

i) pretreating the lean acid gas stream (1) for the removal of aromatic hydrocarbons and $C_4^+$ aliphatic hydrocarbons according to the above described process to obtain a lean acid gas depleted in $C_4^+$ aliphatic hydrocarbons and aromatic hydrocarbons (21) or (26), ii) mixing at least part of the pretreated lean acid gas depleted in $C_4^+$ aliphatic hydrocarbons and aromatic hydrocarbons (21) or (26) with an oxygen containing gas, for example air, to obtain a gas stream containing both $H_2S$ and oxygen, iii) optionally introducing part of the obtained lean acid gas depleted in aromatic hydrocarbons (21) or (26) and oxygen into a furnace to recover elemental sulfur, iv) passing the lean acid gas depleted in $C_4^+$ aliphatic hydrocarbons and aromatic hydrocarbons recovered from step ii) and optionally step iii), after having optionally being preheated, into a catalytic reactor containing a catalyst system which catalyzes the direct oxidation of $H_2S$ with oxygen and/or the Claus reaction of $H_2S$ with sulfur dioxide ($SO_2$) so as to recover a lean acid gas stream depleted in $H_2S$ and elemental sulfur.

BRIEF DESCRIPTION OF THE DRAWINGS

In the following the present invention will be explained in more detail with reference to the figures.

STEP A

Figure 1:
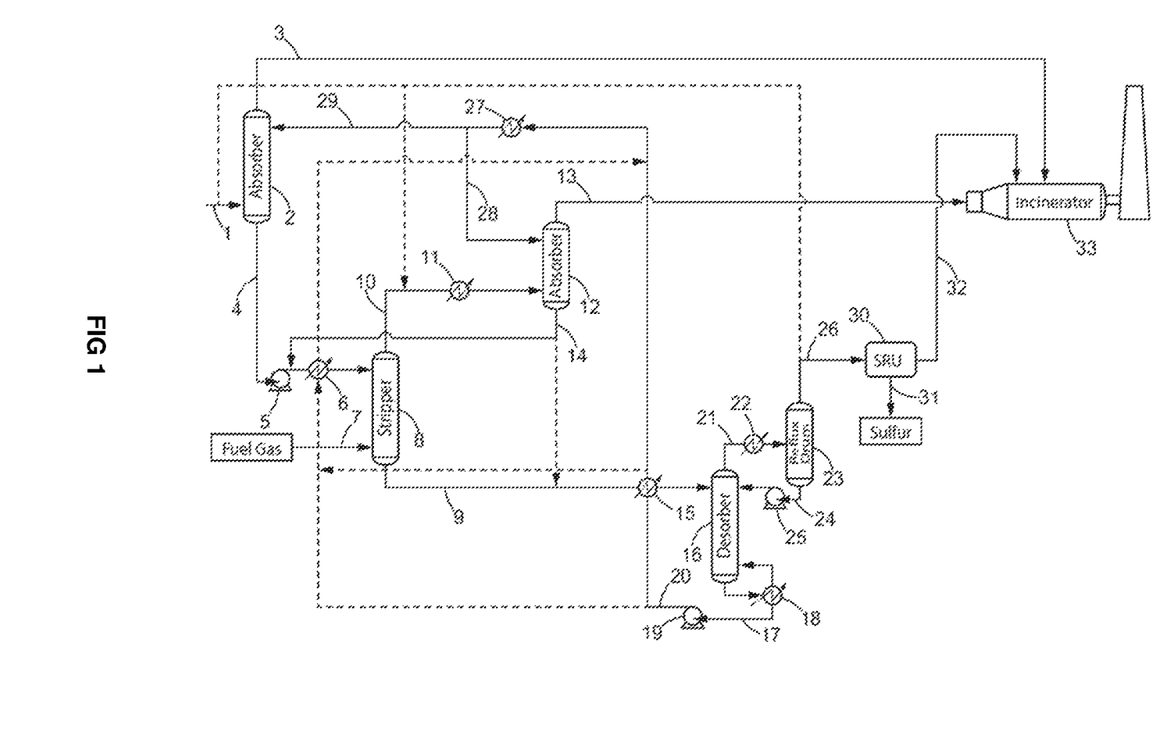
FIG. 1 schematically shows a preferred process of the present invention. The dotted lines represent optional embodiments of the invention.

The process for the removal of aromatic hydrocarbons (BTX) from a lean acid gas according to the present invention comprises a first step a) of contacting the lean acid gas stream (1) with a $H_2S$-selective liquid absorbent solution (29) in a first absorption zone (2) to produce a gas stream depleted in $H_2S$ (3) and containing $CO_2$, aromatic hydrocarbons and $C_4^+$ aliphatic hydrocarbons, and an absorbent solution enriched in $H_2S$ (4), also containing co-absorbed $C_4^+$ aliphatic hydrocarbons, aromatic hydrocarbons and $CO_2$.

The aim of step a) is to decrease as much as possible the $H_2S$ content in the gas feed in order to obtain a gas stream depleted in $H_2S$ (3) suitable for combustion in the incinerator (33) and emission to atmosphere. The gas (3) exiting the first absorption zone (2) is depleted in $H_2S$ and contains $CO_2$, aromatic hydrocarbons and $C_4^+$ aliphatic hydrocarbons.

The decrease of $H_2S$ content in the lean acid gas is obtained by adsorption of the $H_2S$ by the $H_2S$-selective liquid absorbent solution (29). Therefore, at the bottom of the first absorption zone (2), a liquid absorbent solution enriched in $H_2S$ is obtained. However, even though the first absorption step a) is operated at quite low pressure (1 to 8 barA), parts of the aromatic hydrocarbons and $C_4^+$ aliphatic hydrocarbons contained in the lean acid gas (1) will be simultaneously co-absorbed by the liquid absorbent solution (29) and will need to be further treated.

Within the meaning of the present invention, the lean acid gas preferably contains:
- 75 to 99.925 mol. % of $CO_2$,
- 250 mol. ppm to 20 mol. % of $H_2S$, preferably 500 mol. ppm to 15 mol. % of $H_2S$, more preferably 500 mol. ppm to 10 mol. % of $H_2S$ and even more preferably 500 mol. ppm to 5 mol. % $H_2S$,
- 500 mol. ppm to 5 mol. % of $C_4^+$ aliphatic hydrocarbons and aromatic hydrocarbons, the percentages being expressed on a dry basis, in moles, relative to the total mole of the lean acid gas. Indeed, the lean acid gas is generally saturated with water.

In a preferred embodiment, the lean acid gas containing $CO_2$ and less than 20 mol. % of $H_2S$ entering the process of the invention is obtained from a natural gas comprising methane ($CH_4$) and ethane ($C_2H_6$), $CO_2$, $H_2S$ and $C_4^+$ aliphatic hydrocarbons and aromatic hydrocarbons.

Indeed, such natural gas is intended to be used as a combustible and therefore should not contain any pollutant such as acid gas ($CO_2$, $H_2S$). Specifications relative to $H_2S$ concentration in natural gas are very strict and its maximal concentration should remain below 4 ppm mol. The concentration in $CO_2$ on the other hand should preferably remain below 2%, depending on the later use of the natural gas, and on the legislation. The natural gas thus needs to be treated to remove the acid gases ($CO_2$, $H_2S$) contained therein. A purified natural gas meeting the standards for transport, storage and also private or commercial use is then obtained, but a lean acid gas containing $CO_2$, $H_2S$ and also aromatic hydrocarbons and $C_4^+$ aliphatic hydrocarbons is simultaneously produced. This lean acid gas needs to be treated prior to sulfur recovery.

Thus, in a preferred embodiment, the lean acid gas containing $CO_2$ and less than 20 mol. % of $H_2S$ is obtained according to a process comprising:
a) contacting natural gas comprising methane ($CH_4$) and ethane ($C_2H_6$), $CO_2$, $H_2S$ and $C_4^+$ aliphatic hydrocarbons and aromatic hydrocarbons, with a liquid absorbent solution in an absorption zone to produce a natural gas stream depleted in $H_2S$ and $CO_2$ and comprising methane ($CH_4$) and ethane ($C_2H_6$), and an absorbent solution enriched in $H_2S$ and $CO_2$, and also containing co-absorbed $C_4^+$ aliphatic hydrocarbons and aromatic hydrocarbons and,
b) introducing the absorbent solution enriched in $H_2S$ and $CO_2$, and also containing co-absorbed $C_4^+$ aliphatic hydrocarbons and aromatic hydrocarbons into a desorption zone wherein the liquid absorbent solution is recovered and a lean acid gas containing $CO_2$ and less than 20 mol. % of $H_2S$ is produced.

The natural gas used to obtain a lean acid gas for the purpose of the invention contains $C_4^+$ aliphatic hydrocarbons and aromatic hydrocarbons, and few $H_2S$ compared to $CO_2$ amount (for example, the amount of $CO_2$ being at least 4 times higher than the amount of $H_2S$.

Step a) can preferably be operated:
- at a temperature ranging from 50 and 200° C., preferably from 110 and 145° C. and,
- at a pressure ranging from 1 barA to 8 barA and preferably from 1.5 to 3 barA, The $H_2S$-selective liquid absorbent solution can be any of the known absorbents conventionally used by the skilled person, such as chemical solvents, physical solvents and mixtures thereof. When a chemical solvent is used as liquid absorbent solution, it may be associated with a physical solvent to enhance the absorption of the contaminants commonly found in the lean acid gas streams.

Chemical solvents can for example include alkali metal carbonate and phosphate, or alkanolamines, preferably in the form of aqueous solutions.

Alkanolamines are preferably chosen from tertiary alkanolamines and sterically hindered alkanolamines. The sterically hindered alkanolamine can be selected from the group consisting of 2-amino-2-methylpropanol, 2-amino-2-methyl-1,3-propanediol, 2-amino-2-hydroxymethyl-1,3-propanediol, 2-amino-2-ethyl-1,3-propanediol, 2-hydroxymethyl piperidine, 2-(2-hydroxyethyl) piperidine, 3-amino-3-methyl-1-butanol and mixtures thereof.

Suitable alkanolamines include methyldiethanolamine (MDEA), triethanolamine, or one or more dipropanolamines, such as di-n-propanolamine or diisopropanolamine.

Physical solvents can for example include a substituted or unsubstituted tetramethylene sulfone or thioglycols, In a preferred embodiment, the $H_2S$-selective liquid absorbent solution contains an amine, preferably an alkanolamine, more preferably a tertiary alkanolamine or sterically hindered alkanolamine, and even more preferably methyldiethanolamine (MDEA). Aqueous methyldiethanolamine (MDEA) solutions are preferred liquid absorbent solution according to the invention.

In another preferred embodiment, the $H_2S$-selective liquid absorbent solution can be a mixture of alkanolamines and thioglycols.

Additives components capable of enhancing the selectivity of $H_2S$ adsorption towards $CO_2$ such as acidic components like phosphoric acid ($H_3PO_4$) can also be introduced in the liquid absorbent solution.

Concentrations of aqueous alkanolamine solutions may vary widely, and those skilled in the art can adjust solution concentrations to achieve suitable absorption levels. In general, the concentration of alkanolamine in aqueous solutions will be from 5 to 60% by weight, and preferably between 25 and 50% by weight. If a physical solvent is employed as a component of the absorbent liquid, it can be present in an amount from 2 to 50% by weight, preferably from 5 to 45% by weight.

The absorption step a) is preferably conducted:
- at a temperature ranging from 10 to 100° C., preferably 30 to 70° C. and more preferably 40 to 60° C., and
- at a pressure ranging from 1 to 8 barA, preferably 1.5 to 4 barA.

The gas stream depleted in $H_2S$ (3) exiting the first absorption zone (2) preferably contains $CO_2$, aromatic hydrocarbons and $C_4^+$ aliphatic hydrocarbons, and in particular:
- 60 to 99 mol. % of the $CO_2$ contained in the lean acid gas (1) and more preferably 80 to 98 mol. %,
- 60 to 99% of aromatic hydrocarbons and $C_4^+$ aliphatic hydrocarbons contained in the lean acid gas (1) and more preferably 80 to 98 mol. %,
- 0.001 to 20 mol. % of $H_2S$ contained in the lean acid gas (1) and more preferably 0.002 to 5 mol. %.

The gas stream depleted in $H_2S$ (3) exiting the first absorption zone (2) can then be transferred to an incinerator (33) where it will be combusted to destruct remaining $H_2S$ as well as the aromatic hydrocarbons and $C_4^+$ aliphatic hydrocarbons contained therein, thus reaching the standards requirements for air emission. Alternatively gas stream depleted in $H_2S$ (3) can be compressed, injected and disposed in an underground storage reservoir rather than being incinerated and released to the atmosphere.

The absorbent solution enriched in $H_2S$ (4) exiting the first absorption zone (2) also contains co-absorbed $C_4^+$ aliphatic hydrocarbons, aromatic hydrocarbons and $CO_2$. In a preferred embodiment, the absorbent solution enriched in $H_2S$ (4) exiting the first absorption zone (2) contains:

- 80 to 99.999 mol. % of the $H_2S$ contained in the lean acid gas (1), and more preferably 95 to 99.99 mol. %,
- 0.5 to 40 mol. % of the $CO_2$ contained in the lean acid gas (1), more preferably 1 to 15 mol. %,
- 0.5 to 40 mol. % of the $C_4^+$ aliphatic hydrocarbons and aromatic hydrocarbons contained in the lean acid gas (1), more preferably 1 to 10 mol. %.

STEP B

The absorbent solution enriched in $H_2S$ (4) exiting the first absorption zone (2) is then sent to a non-thermic stripping zone (8) where it is contacted with a stripping gas stream (7), preferably fuel gas, to obtain an absorbent solution depleted in $C_4^+$ aliphatic hydrocarbons and aromatic hydrocarbons (9) and containing $H_2S$ and $CO_2$ and a stripping gas stream enriched in aromatic hydrocarbons and $C_4^+$ aliphatic hydrocarbons (10), also containing $H_2S$ and $CO_2$.

Indeed, further to the first absorption step a), the absorbent solution enriched in $H_2S$ (4) also contains co-absorbed $C_4^+$ aliphatic hydrocarbons and aromatic hydrocarbons.

The aim of step b) is thus to remove as much $C_4^+$ aliphatic hydrocarbons and aromatic hydrocarbons as possible from the absorbent solution, with as few $H_2S$ as possible, so that when the lean acid gas is recovered, it does not contain high concentration of impurities capable of poisoning the sulfur recovery unit catalysts. This is done by contacting the absorbent solution enriched in $H_2S$ (4) with a countercurrent of stripping gas, such as fuel gas stream (7), in a non-thermic stripping step.

Prior art stripping steps are conventionally operated either simply by heating the absorbent solution enriched in $H_2S$ to produce steam as stripping stream, or by injecting directly stream in the stripping zone. The provision of heat to the stripping zone increases the chemical desorption of acid gas, in particular $H_2S$, from the absorbent solution and favors its removal with the stripping stream. An absorbent solution substantially depleted in $H_2S$ is therefore obtained with the conventional stripping steps of the prior art. To the contrary, the stripping step of the claimed process is athermic in the sense that no significant heat or energy is provided to the process at this stage. By operating the stripping step with no significant heating, it was possible to more selectively strip the $C_4^+$ aliphatic hydrocarbons and aromatic hydrocarbons over $H_2S$ in order to obtain an absorbent solution depleted in $C_4^+$ aliphatic hydrocarbons and aromatic hydrocarbons (9) and containing $H_2S$ and $CO_2$ and a stripping gas stream enriched in aromatic hydrocarbons and $C_4^+$ aliphatic hydrocarbons (10), also containing a small quantity of $H_2S$ but significantly less than what would be obtained with a thermal stripping step.

The obtained absorbent solution (9) is depleted in $C_4^+$ aliphatic hydrocarbons and aromatic hydrocarbons. The stripping gas stream (7) will preferentially strip off the $C_4^+$ aliphatic hydrocarbons and aromatic hydrocarbons over $H_2S$ from the absorbent solution enriched in $H_2S$ (4), but will however also drag away part of the $H_2S$ and $CO_2$ contained in the absorbent solution (4). The stripping gas stream exiting the stripping zone (8) is thus enriched in aromatic hydrocarbons and $C_4^+$ aliphatic hydrocarbons (10) but also contains $H_2S$ and $CO_2$.

The stripping gas used in the stripping zone of the process of the invention can preferably be a fuel gas stream, but may also be any combustible gas meeting standards requirements for a combustible, for example natural gas, hydrogen, and/or synthetic gas containing mostly $H_2$ and CO, or any other inert gas containing mainly nitrogen or helium for example. The fuel gas, or any combustible gas, used in the stripping zone can thus be used as a feed/combustible in the incinerator (33) and/or in the utility boilers.

In a preferred embodiment, the stripping gas is a fuel gas and, preferably, the fuel gas (7) used in the stripping zone (8) is the combustible gas used to run the incinerator (33) and/or utility boilers in the unit. Indeed, the plant where the process of the invention is conducted generally comprises incinerators and/or utility boilers for various purposes. Said incinerators and boilers have to be fed with fuel gas. One advantage of the present invention is that the fuel gas that is needed to feed the incinerators and/or utility boilers of the plant is used first as a stripping gas, and then recovery and rerouted to its original path to feed the incinerators and/or utility boilers. The utility boilers (not shown in the figure) produce steam which could feed boilers of the plant where the claimed process is conducted, as for example the boiler (18) in FIG. 1. The fuel gas flow rate in the stripping zone is limited by the combustible gas flow rate necessary to run the incinerator (33) and/or the utility boilers. In this embodiment, the fuel gas is used consecutively as a stripping gas in the stripping zone (8) and as a combustible gas to run the incinerator and/or the utility boilers, which is economically advantageous.

In this stripping step, the stripping gas stream (7) is preferably introduced at the bottom of the stripping zone in order to be contacted with a countercurrent of absorbent solution enriched in $H_2S$ (4).

The stripping in step b) is preferably conducted:
- at a temperature ranging from 50 to 150° C., preferably 60 to 130° C. and more preferably 70 to 110° C., and
- at a pressure ranging from 1 to 8 barA, preferably 1.5 to 4 barA.

In order for the absorbent solution enriched in $H_2S$ (4) to meet pressure conditions required in the stripping zone, it may be necessary to pass it though a pump (5) or alternatively though a valve before it enters the stripping zone.

In some cases where the installation is restricted, for example in terms of flow rate of the stripping gas stream, it may be interesting that the absorbent solution enriched in $H_2S$ (4) also passes through a heater (6) to increase its temperature before entering the stripping zone (8) to efficiently remove the aromatic hydrocarbons and $C_4^+$ aliphatic hydrocarbons. In this embodiment, the heat provided to the stripping step should be controlled to increase the removal of aromatic hydrocarbons and $C_4^+$ aliphatic hydrocarbons while ensuring that only a minimal amount of $H_2S$ is desorbed from the absorbent solution to avoid obtaining a stripping gas stream (7) that would be enriched with $H_2S$. Indeed, in such case where the stripping gas stream (7) is enriched with $H_2S$, an increase of the size of the second absorption zone will be needed to ensure complete removal of $H_2S$. In a preferred embodiment, the temperature increase in the heater (6) may be obtained by recirculating in the heater (6), at least a part of the $H_2S$-selective liquid absorbent solution (17) recovered from the desorption zone (16), and/or exiting the heat exchanger (heater 15). The $H_2S$-selective liquid absorbent solution thus acts as a heating source for the heater (6).

As mentioned above, the stripping gas stream (10) exiting the stripping zone (8) is enriched in aromatic hydrocarbons and $C_4^+$ aliphatic hydrocarbons but also contains $H_2S$ and $CO_2$. It preferably contains:
- 50 to 99 mol. %, preferably 85 à 99 mol. % of the aromatic hydrocarbons and $C_4^+$ aliphatic hydrocarbons contained in the absorbent solution (4) entering the stripping zone (8),
- 5 to 40 mol. %, preferably 5 à 20 mol. % of the $CO_2$ contained in the absorbent solution (4) entering the stripping zone (8), and
- 1 to 20 mol. %, preferably 1 to 10 mol. % of the $H_2S$ contained in the absorbent solution (4) entering the stripping zone (8).

The absorbent solution (9) exiting the stripping zone (8) is depleted in $C_4^+$ aliphatic hydrocarbons and aromatic hydrocarbons, and preferably contains:
- 80 to 99 mol. %, preferably 90 to 99 mol. % of the $H_2S$ contained in the absorbent solution (4) entering the stripping zone (8)
- 1 to 50 mol. %, preferably 1 à 15 mol. % of the aromatic hydrocarbons and $C_4^+$ aliphatic hydrocarbons contained in the absorbent solution (4) entering the stripping zone (8), and
- 60 to 95 mol. %, preferably 70 to 90 mol. % of the $CO_2$ contained in the absorbent solution (4) entering the stripping zone (8).

In a preferred embodiment, the absorbent solution (9) exiting the stripping zone (8) contains 0.01 to 10 mol. % of the aromatic hydrocarbons and $C_4^+$ aliphatic hydrocarbons contained in the lean acid gas (1), more preferably 0.1 to 5 mol. %.

STEP C

The stripping gas stream enriched in aromatic hydrocarbons and $C_4^+$ aliphatic hydrocarbons (10), also containing $H_2S$ and $CO_2$ obtained in step b) is contacted with a $H_2S$-selective liquid absorbent solution (28) in a second absorption zone (12) to obtain a stripping gas stream depleted in $H_2S$ and containing aromatic hydrocarbons, $C_4^+$ aliphatic hydrocarbons and $CO_2$ (13), and an absorbent solution enriched in $H_2S$ (14) also containing co-absorbed aromatic hydrocarbons, $C_4^+$ aliphatic hydrocarbons and $CO_2$, said $H_2S$-selective liquid absorbent solution preferably being identical to that used in step a).

In particular, more than 80% of the stripping gas stream enriched in aromatic hydrocarbons and $C_4^+$ aliphatic hydrocarbons (10), preferably more than 90% and more preferably all the stripping gas stream (10) obtained in step b) is sent to the second absorption zone (12).

Indeed, further to the stripping step b), the stripping gas stream is enriched in aromatic hydrocarbons and $C_4^+$ aliphatic hydrocarbons (10) but also contains $H_2S$ and $CO_2$.

The aim of step c) is thus to remove as much $H_2S$ as possible from the stripping gas stream (10) so as to recover a stripping gas stream suitable for further use as a combustible, such as fuel gas for the incinerator (33) and/or the utility boilers. Alternatively, the stripping gas stream depleted in $H_2S$ can be compressed, injected and disposed in an underground storage reservoir rather than being incinerated and released to the atmosphere. This is done by contacting the stripping gas stream enriched in aromatic hydrocarbons and $C_4^+$ aliphatic hydrocarbons (10) with a countercurrent of $H_2S$-selective liquid absorbent solution (28), said $H_2S$-selective liquid absorbent solution being preferably the one used in step a).

The $H_2S$-selective liquid absorbent solution (28) may for example be obtained by derivation of the main solvent stream (29) entering the first absorption zone.

The conditions of temperature and pressure operated in the second absorption zone (12) are preferably the same as those previously disclosed for the first absorption zone in step a).

Optionally, in order for the stripping gas stream enriched in aromatic hydrocarbons and $C_4^+$ aliphatic hydrocarbons (10) but also containing $H_2S$ and $CO_2$, to meet temperature conditions required in the second absorption zone (12), it may be necessary to pass it though a cooler (11) and, optionally, a separator to recover condensed water, before it enters the second absorption zone (12).

The stripping gas stream (13) exiting the second absorption zone (12) preferably contains aromatic hydrocarbons, $C_4^+$ aliphatic hydrocarbons and $CO_2$, and in particular:
- 60 to 99 mol. % of the $CO_2$ contained in the stripping gas stream (10) exiting the stripping zone (8), more preferably 80 to 98 mol. %
- 60 to 99 mol. % of the aromatic hydrocarbons (BTX) and $C_4^+$ aliphatic hydrocarbons contained in the stripping gas stream (10) exiting the stripping zone (8), more preferably 80 to 98 mol. % and
- 0.01 to 20 mol. % of $H_2S$ contained in the stripping gas stream (10) exiting the stripping zone (8), more preferably 0.02 to 5 mol. %.

The stripping gas stream depleted in $H_2S$ and containing aromatic hydrocarbons, $C_4^+$ aliphatic hydrocarbons and $CO_2$ (13) exiting the second absorption zone (12) meets standards requirements as a combustible, such as fuel gas, and can thus be used as a feed in the incinerator (33) and/or in the utility boilers where associated aromatic hydrocarbons (BTX) and $C_4^+$ aliphatic hydrocarbons, as well as remaining sulfur species, will be destructed. Alternatively, the stripping gas stream depleted in $H_2S$ (13) can be compressed, injected and disposed in an underground storage reservoir rather than being incinerated and released to the atmosphere.

The absorbent solution enriched in $H_2S$ (14) exiting the second absorption zone (12) also contains co-absorbed aromatic hydrocarbons (BTX), $C_4^+$ aliphatic hydrocarbons and $CO_2$.

In a preferred embodiment, the absorbent solution enriched in $H_2S$ (14) exiting the second absorption zone (12) contains:
- 1 to 40 mol. % of the $CO_2$ contained in the stripping gas stream (10) exiting the stripping zone (8), more preferably 2 to 20 mol. %
- 1 to 40 mol. % of the aromatic hydrocarbons (BTX) and $C_4^+$ aliphatic hydrocarbons contained in the stripping gas stream (10) exiting the stripping zone (8), more preferably 2 to 20 mol. % and
- 80 to 99.99 mol. % of $H_2S$ contained in the stripping gas stream (10) exiting the stripping zone (8), more preferably 95 to 99.98 mol. %.

Depending on the amount of aromatic hydrocarbons (BTX), $C_4^+$ aliphatic hydrocarbons co-absorbed therein, the absorbent solution enriched in $H_2S$ (14) exiting the second absorption zone (12) can be recycled back to the stripping zone (8) to supplement the absorbent solution enriched in $H_2S$ (4) and/or can be directly introduced into the desorption zone (16) to supplement the absorbent solution depleted in aromatic hydrocarbons (9) obtained in step b).

In a preferred embodiment, the absorbent solution enriched in $H_2S$ (14) exiting the second absorption zone (12) is entirely recycled to the stripping zone to supplement the absorbent solution enriched in $H_2S$ (4) in order to decrease aromatic (BTX) and $C_4^+$ aliphatic hydrocarbons content in the absorbent solution enriched in $H_2S$ (9) sent to the desorption zone (16).

The stripping zone (8) and the second absorption zone (12) are designed to significantly reduce the amount of aromatic hydrocarbons (BTX) and $C_4^+$ aliphatic hydrocarbons in the absorbent solution depleted in $H_2S$ entering the desorption zone (16) in comparison to their amount in the absorbent solution enriched in $H_2S$ (4) exiting the first absorption zone and even more in comparison with their initial amount in the lean acid gas stream (1).

STEP D

The absorbent solution depleted in $C_4^+$ aliphatic hydrocarbons and aromatic hydrocarbons (9) exiting the stripping zone (8), optionally supplemented with the absorbent solution enriched in $H_2S$ (14) exiting the second absorption zone (12), is further introduced into a desorption zone (16) wherein the $H_2S$-selective liquid absorbent solution (17) is recovered and a lean acid gas containing $H_2S$ and $CO_2$, depleted in $C_4^+$ aliphatic hydrocarbons and aromatic hydrocarbons (21) is produced.

Indeed, the absorbent solution exiting the stripping step b) and the second absorption step c) are depleted in $C_4^+$ aliphatic hydrocarbons and aromatic hydrocarbons (9) but still contain $H_2S$ and $CO_2$.

The aim of step d) is thus to desorb as much $H_2S$ and $CO_2$ as possible from the absorbent solution (9) so as to recover a purified absorbent solution that can be recycled back to the first and/or second absorption zones. This is done by heating the absorbent solution (9) in a desorption zone (16).

The desorption step d) is preferably conducted:
at a temperature ranging from 50 to 200° C., preferably 70 to 180° C. and more preferably 110 to 145° C., and
at a pressure ranging from 1 to 4 barA, preferably 1.5 to 3 barA.

In a preferred embodiment, the absorbent solution depleted in $C_4^+$ aliphatic hydrocarbons and aromatic hydrocarbons (9) recovered from the stripping zone (8) may also pass through a heater (15) to increase its temperature before entering the desorption zone in order to reduce the energy consumption for steam circulation in the desorption zone. The temperature increase in the heater (15) can preferably be obtained by recirculating in the heater (15), at least a part of the regenerated liquid absorbent solution (17) recovered from the desorption zone (16). The regenerated liquid absorbent solution (17) thus acts as a heating medium for the heater (15).

A steam is generated in the desorption zone (16) thus providing the energy necessary to remove $H_2S$, $CO_2$, hydrocarbons, and aromatics such as BTX from the absorbent solution. The steam may be produced by heat exchange with the liquid absorbent solution present in the bottom of the desorption zone (16) through any heating means (steam, hot oil, furnace, burner, boiler).

The desorption zone (16) can thus preferably comprise a boiler (18) at its bottom in which steam circulates in order to permit the regeneration of the absorbent solution enriched in $H_2S$.

The regenerated liquid absorbent solution (17) leaving the bottom of the desorption zone (16) may then be sent back to the first adsorption zone (2) as the $H_2S$-selective liquid absorbent solution (29) and/or to the second adsorption zone (12) as the $H_2S$-selective liquid absorbent solution (28).

In order for the regenerated liquid absorbent solution (17) to meet temperature and pressure conditions required in the first and second absorption zones (2) and (12), it may be necessary to pass it though heat exchanger (27) and pump (19) or alternatively though a valve before it enters the absorption zones.

The lean gas (21) exiting the desorption zone (16) further contains steam and vaporized absorbent solution. The water issued from the steam and the vaporized absorbent solution carried with the lean gas (21) exiting the desorption zone (16) can be partially separated from the lean acid gas depleted in aromatic hydrocarbons (21) in the condenser (22) and further trapped in the reflux drum (23) which acts as an accumulator. The water and the absorbent solution can then be recycled to the desorption zone (16) though a pump (25) in order to limit water and absorbent solution loss. A lean acid gas depleted in aromatic hydrocarbons (26) is recovered. The condenser is preferably operated at a temperature ranging from more preferably from 20 to 70° C. and even more preferably from 40 to 60° C.

The lean acid gas (21) or (26) is depleted in aromatic hydrocarbons and $C_4^+$ aliphatic hydrocarbons and preferably contains 0.01 to 10 mol. % of the aromatic hydrocarbons (BTX) and $C_4^+$ aliphatic hydrocarbons contained in the lean acid gas entering the process, more preferably 0.1 to 5 mol. %.

In addition, the lean acid gas depleted in aromatic hydrocarbons (21) or (26) recovered at the end of the process of the invention has preferably a $H_2S/CO_2$ ratio higher than the $H_2S/CO_2$ ratio of the lean acid gas (1) entering the process.

In a preferred embodiment, the lean acid gas depleted in aromatic hydrocarbons (21) or (26) recovered after the desorption zone (16) may be partially recycled to supplement the lean acid gas stream (1) entering the process, and/or to supplement the stripping gas stream enriched in aromatic hydrocarbons and $C_4^+$ aliphatic hydrocarbons (10) but also containing $H_2S$ and $CO_2$.

It is of the merit of the inventors to have discovered that the specific succession of absorption and stripping steps according to the present invention made it possible to remove high amounts of aromatic hydrocarbons such as BTX and $C_4^+$ aliphatic hydrocarbons from lean acid gases containing less than 20 mol. % of $H_2S$ although none of these steps conducted separately was considered sufficient to fulfil this goal. Contrary to the skilled person's expectations, the lean acid gas depleted in aromatic hydrocarbons and $C_4^+$ aliphatic hydrocarbons produced is suitable for a subsequent sulfur recovery treatment because even if it is not enriched in $H_2S$ to reach a proportion of more than 55 mol. %, which would be necessary to be properly operated in a Claus furnace (first step of sulfur recovery), it contains a sufficiently low amount of aromatic hydrocarbons such as BTX and $C_4^+$ aliphatic hydrocarbons to allow its use in a sulfur recovery unit operating with partial by-pass of the furnace or even no thermal step at all. In a preferred embodiment, the stripping gas stream (7) is a combustible and its flow rate is adapted to the incinerator (33) and/or utility boilers needs.

In a preferred embodiment, the content of aromatic hydrocarbons, such as benzene, toluene, ethylbenzene and xylene (BTX) and $C_4^+$ aliphatic hydrocarbons in the lean acid gas (21) or (26) recovered at the end of the process of the invention should be as low as possible and no higher than 500 mol. ppm, preferably between 1 and 500 mol. ppm, in order to prevent Claus catalyst deactivation in a further sulfur recovery unit.

Process for Sulfur Recovery from a Lean Acid Gas Containing Less Than 20 mol. % of $H_2S$ The obtained lean acid gas depleted in aromatic hydrocarbons (21) or (26) is suitable for use as a feed in a sulfur recovery unit (30).

Therefore another object of the invention is a process for sulfur recovery from a lean acid gas containing $CO_2$ and less than 20 mol. % of $H_2S$, which process comprises:

i) pretreating the lean acid gas stream (1) for the removal of aromatic hydrocarbons and $C_4^+$ aliphatic hydrocarbons according to the process previously described to obtain a lean acid gas depleted in $C_4^+$ aliphatic hydrocarbons and aromatic hydrocarbons (21) or (26), ii) mixing at least part of the pretreated lean acid gas depleted in $C_4^+$ aliphatic hydrocarbons and aromatic hydrocarbons (21) or (26) with an oxygen containing gas, for example air, to obtain a gas stream containing both $H_2S$ and oxygen, iii) optionally introducing part of the obtained lean acid gas depleted in aromatic hydrocarbons (21) or (26) and oxygen into a furnace to recover elemental sulfur, iv) passing the lean acid gas depleted in $C_4^+$ aliphatic hydrocarbons and aromatic hydrocarbons recovered from step ii) and optionally step iii), after having optionally being preheated, into a catalytic reactor containing a catalyst system which catalyzes the direct oxidation of $H_2S$ with oxygen and/or the Claus reaction of $H_2S$ with sulfur dioxide ($SO_2$) so as to recover a lean acid gas stream depleted in $H_2S$ (32) and elemental sulfur.

Usually, the elemental sulfur is recovered in a condenser.

Step iv) may preferably be repeated several times, more preferably at least twice.

The process for sulfur recovery will be easily adapted by the skilled person depending on the content of $H_2S$ in the lean acid gas depleted in $C_4^+$ aliphatic hydrocarbons and aromatic hydrocarbons (21) or (26) obtained after the pretreating step i).

When the content of $H_2S$ in the lean acid gas depleted in $C_4^+$ aliphatic hydrocarbons and aromatic hydrocarbons (21) or (26) is below 15 mol. %, the sulfur recovery process can preferably be only a catalytic direct oxidation process (without thermal step iii)). In this case, the lean acid gas depleted in $C_4^+$ aliphatic hydrocarbons and aromatic hydrocarbons (21) or (26) may be preheated before entering the catalytic reactor.

When the content of $H_2S$ in the lean acid gas depleted in $C_4^+$ aliphatic hydrocarbons and aromatic hydrocarbons (21) or (26) is ranging between 15 and 55 mol. %, a conventional Claus process coupling thermal step iii) and catalytic Claus step iv) can be operated. In such case, generally only a part of the lean acid gas depleted in $C_4^+$ aliphatic hydrocarbons and aromatic hydrocarbons (21) or (26) is sent to the furnace and the rest of the lean acid gas by-passes the burner of the furnace to directly undergo oxidation in the furnace. This partial by-pass of the burner of the thermal step iii) is needed to maintain a stable flame in the burner considering the high content of inert gas such as $CO_2$ and/or $N_2$, in the lean acid gas.

Alternatively and preferably, catalytic direct oxidation process can be performed isothermally or pseudo-isothermally with the help of internal cooler, such as thermoplates like the SmartSulf™ technology. Such technology is advantageous for catalytic reactor following a Claus thermal step (iii)), and even more advantageous in the case of direct oxidation without Claus thermal step (iii)), as it could be considered in the case of a content of $H_2S$ below 15 mol. % in the lean acid gas (21) or (26).

The SmartSulf™ technology is disclosed in details in document US2013/0129589, the entire content of which is hereby incorporated by reference.

According to a preferred embodiment, step iv) of the process for sulfur recovery from a lean acid gas containing $CO_2$ and less than 20 mol. % of $H_2S$, includes and/or is followed by:

iv.1 transferring the lean acid gas stream containing both $H_2S$ and oxygen into a first section of a first reactor, after having optionally being preheated, which first section contains a non-cooled adiabatic bed containing a first catalyst which catalyzes the oxidation of $H_2S$ with oxygen and the oxidation of $H_2S$ with sulfur dioxide, wherein the maximum temperature of the adiabatic bed is T1, iv.2 transferring the lean acid gas stream from the first section of the first reactor to a second section of the first reactor, which second section contains a second catalyst which can be different from the first catalyst and which second section is kept at a temperature T2 wherein T2≤T1 and T2 is higher than the dew point temperature of elemental sulfur, whereby a gas stream depleted in $H_2S$ is obtained, iv.3 transferring the gas stream depleted in $H_2S$ to a sulfur condenser to obtain a gas stream depleted in sulfur, iv.4 optionally preheating the gas stream depleted in sulfur iv.5 transferring the gas stream depleted in sulfur into the first section of a second reactor, which first section contains a non-cooled adiabatic bed containing the same catalyst as the first section of the first reactor, wherein the first section of the second reactor is operated at a temperature that is above the dew point of the elemental sulfur so that in the first section of the second reactor no elemental sulfur deposits as liquid or solid on the catalyst, iv.6 transferring the gas stream from the first section of the second reactor to the second section of the second reactor which contains the same catalyst as the second section of first reactor and which second section is kept at a temperature that is at or below the dew point of elemental sulfur so that in the second section of the second reactor elemental sulfur deposits as liquid or solid on the catalyst, and desulfurized gas stream meeting standard requirements for air emissions is obtained, iv.7 after a defined time switching the operation conditions of the first reactor and the second reactor and switching the gas flow simultaneously so that the previous second reactor becomes the new first reactor and the previous first reactor becomes the new second reactor.

In this preferred embodiment, in steps iv.2) and iv.6), the second section of the reactors can be kept at a temperature that is at or below the dew point of elemental sulfur with the help of an internal cooler such as thermoplates.

In this process, steps iv.1 to iv.7 correspond to the SmartSulf™ technology.

Step iv.7 of switching the operation conditions of the first reactor and the second reactor and switching the gas flow simultaneously makes it possible to desorb the elemental sulfur condensed on the catalyst operated in the second reactor. Indeed, when operated in the first place (at higher temperature), the second reactor is run at higher temperatures thus desorbing the sulfur that condensed on the catalyst when the reactor was previously operated in a second place (at lower temperature).

The lean acid gas stream depleted in $H_2S$ (32) exiting the sulfur recovery unit in step iv) can then be transferred to an incinerator (33) where it will be combusted to destruct remaining $H_2S$ as well as the aromatic hydrocarbons and $C_4^+$ aliphatic hydrocarbons contained therein, thus reaching the standards requirements for air emission. Alternatively gas stream depleted in $H_2S$ (3) can be compressed, injected and disposed in an underground storage reservoir rather than being incinerated and released to the atmosphere.

The present invention will be further illustrated in the following non-limiting examples.

Example 1

Figure 2:
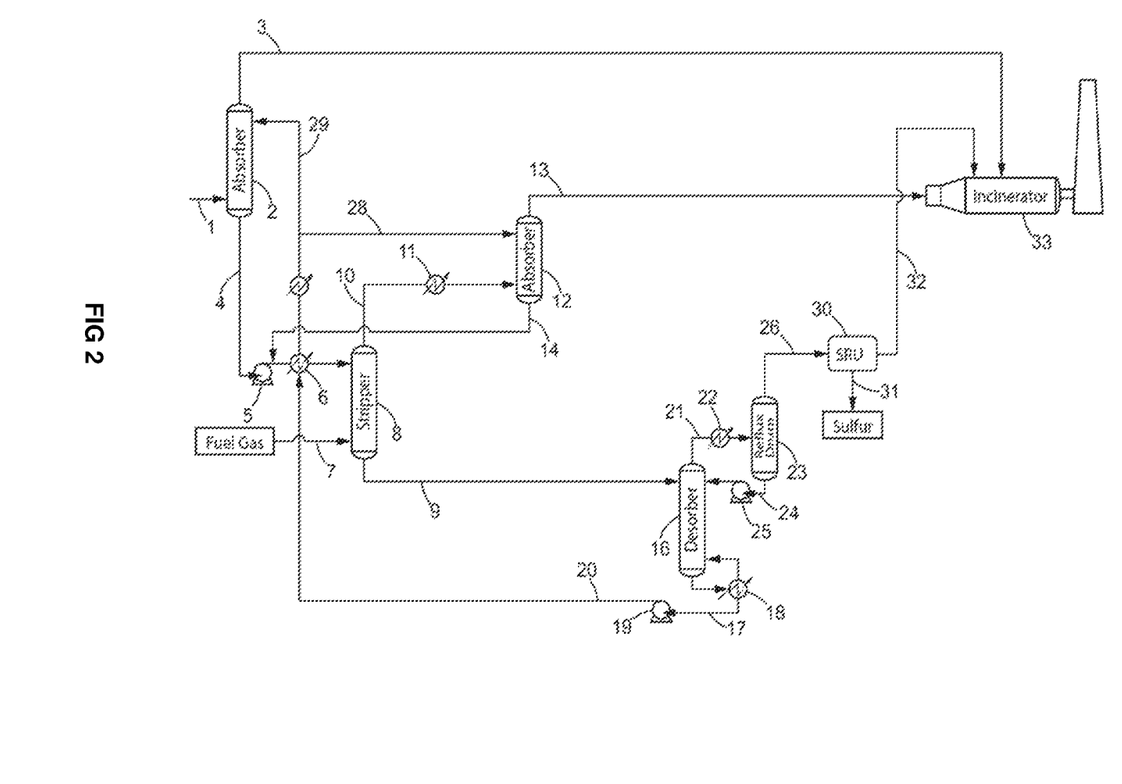
FIG. 2 shows a specific embodiment of the process of the present invention, operated in the illustrative examples.

A process for sulfur recovery from a lean acid gas (1) as illustrated in FIG. 2 was operated using an acid gas containing:
- 10.0 mol. % of $H_2S$,
- 82.1 mol. % of $CO_2$, and
- 2500 mol. ppm of BTX
- 180 mol. ppm of $C_4^+$
- 7.3 mol % of water, the rest being other hydrocarbons such as methane, ethane and propane as well as sulfur species such as mercaptans.

This lean acid gas was sent to a first absorption zone (2) at a flow rate of 2800 kmol/h at a pressure of 1.7 bar. In this first absorption zone (2), the lean acid gas contacted a 45 wt % (11 mol. %) methyldiethanolamine (MDEA) aqueous solution (29), introduced at a flow rate of 480 m³/h, at a temperature of 45° C. and at a pressure of 1.55 barA.

The gas stream (3) exiting the first absorption zone (2) at a flow rate of 2145 kmol/h contained:
- 92.8 mol % of $CO_2$
- <100 ppm mol of $H_2S$, and
- 3000 ppm mol of BTX (representing 92% of the initial amount of BTX in the lean acid gas).
- 230 ppm $C_4^+$ (representing the entire initial amount of $C_4^+$ in the lean acid gas).
- 6.4 mol % of water, the rest being other hydrocarbons such as methane, ethane and propane as well as sulfur species such as mercaptans.

The MDEA solution (4) exiting the first absorption zone (2) absorbs almost the entire amount of $H_2S$ of the lean acid gas and co-absorbs about 8% of the BTX initially present in the lean acid gas. The solvent reaches a temperature of about 62° C.

The MDEA solution (4) exiting the first absorption zone (2) then passed through a pump (5) and through a heater (6) to increase its temperature and pressure in order to enter the stripping zone (8) at a temperature of 92.0° C. and at a pressure of 5 barA.

As can be seen from FIG. 2, the temperature increase in the heater (6) was obtained by recirculating in the heater (6) the MDEA solution (20) recovered from the desorption zone (16).

The heated MDEA solution entered the stripping zone (8) where it was contacted with a countercurrent of a natural gas stream (7) introduced at the bottom of the stripping zone.

The natural gas stream (7) had the following specifications:
- 95.0 mol. % of methane
- 5.0 mol. % of ethane It entered the stripping zone in the following conditions:
Flow rate: 200 kmol/h
Temperature: 15° C.
Pressure: 7.0 barA.

The stripper was operated at a pressure of 5.0 barA.

The fuel gas stream (10) exiting the stripping zone (8) had the following specifications:
Flow rate: 318 kmol/h
Temperature: 90° C.
- 18.5 mol. % of $CO_2$
- 6.4 mol. % of $H_2S$, and
- 1275 mol. ppm of BTX (65% of the BTX entering the stripping zone).

This fuel gas stream (10) exiting the stripping zone (8) was then passed through a heat exchanger and entered a second adsorption zone (12) at a temperature of 45° C.

In the second adsorption zone (12) the fuel gas stream (10) exiting the stripping zone (8) contacted a methyldiethanolamine (MDEA) solution (28) introduced at a flow rate of 30 m³/h, at a temperature of 45° C. and a pressure of 4.0 barA.

The methyldiethanolamine (MDEA) solution is the same as the one used in the first absorption zone (2).

A fuel gas stream (13) exited the second absorption zone (12) at a flow rate of 255 kmol/h with the following composition:
- 19.6 mol. % of $CO_2$
- <100 mol. ppm of $H_2S$, and
- 1 350 mol. ppm of BTX (85% of the BTX entering the second absorption zone in stream 16 and about 5% of the BTX entering the process in stream 1).

The fuel gas stream (13) meets standards requirements for a combustible and can thus be used as a feed in the incinerator (33) and/or in the utility boilers where associated aromatic hydrocarbons (BTX) and $C_4^+$ aliphatic hydrocarbons, as well as remaining sulfur species, will be destructed.

The MDEA solution enriched in $H_2S$ (14) exiting the second absorption zone (12) was recycled to the stripping zone to supplement the MDEA solution enriched in $H_2S$ (4).

An MDEA solution depleted in BTX (9) exited the stripping zone (8) at a temperature of 87° C. and contained 35% of the BTX entering the stripping zone (a flow corresponding to about 3% of the flow of BTX entering the process).

This MDEA solution depleted in BTX (9) was then introduced into a desorption zone (16) equipped with a boiler (18) operating at a temperature of 130° C. and a pressure of 2.4 barA.

The regenerated MDEA solution (17) leaving the bottom of the desorption zone (16) was sent back to the first adsorption zone (2) and to the second adsorption zone (12).

The lean acid gas depleted in BTX (21) exiting the desorption zone (16) was passed through a condenser (22) and a reflux drum (23).

The lean acid gas depleted in BTX (26) recovered at the end of the process of the invention had a temperature of 45° C. and a flow rate of 570 kmol/h. It had the following composition:
- 45.5 mol. % of $CO_2$
- 49.2 mol. % of $H_2S$,
- 390 mol. ppm of BTX (3% of the BTX entering the process), and
- 4.9 mol. % of $H_2O$.

The process of the present invention made it possible to decrease the BTX content of the lean acid gas treated of 97%. The treated lean acid gas was then suitable for a subsequent treatment in a sulfur recovery unit even with an $H_2S$ content lower than 55 mol %.

The obtained acid gas was then treated in a Claus process with 10% of the flow of acid gas by-passing the thermal step (furnace), and 2 reactors (SmartSulf™ technology) being used to operate the catalytic step. A sulfur recovery rate of 99.3% was obtained. 107 tons per day of bright yellow solid sulfur, reaching standards for sulfur recovery were recovered without further treatment.

Example 2

A process for sulfur recovery from a lean acid gas as illustrated in FIG. 2 was operated using an acid gas containing:
- 0.2 mol. % of $H_2S$,
- 92.0 mol. % of $CO_2$, and
- 1500 mol. ppm of BTX.
- 180 mol. ppm $C_4^+$
- 7.3 mol % of water, the rest being other hydrocarbons such as methane, ethane and propane as well as sulfur species such as mercaptans This lean acid gas was sent to a first absorption zone (2) at a flow rate of 2 800 kmol/h. In this a first absorption zone (2), the lean acid gas contacted a 45 wt % (11 mol. %) methyldiethanolamine (MDEA) aqueous solution (29) introduced at a flow rate of 335 m³/h, at a temperature of 45° C. and at a pressure ranging of 1.55 barA.

The gas stream (3) exiting the first absorption zone (2) at a flow rated of 2580 kmol/h contained:
- 92.8 mol. % of $CO_2$
- <100 mol. ppm of $H_2S$, and
- 1510 mol. ppm of BTX (92%).
- 195 mol. ppm of $C_4^+$ (representing the entire initial amount of $C_4^+$ in the lean acid gas).
- 6.6 mol. % of water, the rest being other hydrocarbons such as methane, ethane and propane as well as sulfur species such as mercaptans The MDEA solution (4) exiting the first absorption zone (2) absorbs almost the entire amount of $H_2S$ of the lean acid gas and co-absorbs about 8% of the BTX and reached a temperature of about 55° C.

The MDEA solution (4) exiting the first absorption zone (2) then passed through a pump (5) and through a heater (6) to increase its temperature and pressure in order to enter the stripping zone (8) at a temperature of 93.0° C. and at a pressure of 5 barA.

As can be seen from FIG. 2, the temperature increase in the heater (6) was obtained by recirculating in the heater (6) the MDEA solution (20) recovered from the desorption zone (16).

The heated MDEA solution entered the stripping zone (8) where it was contacted with a countercurrent of a natural gas stream (7) introduced at the bottom of the stripping zone.

The natural gas stream (7) had the following specifications:
- 95.0 mol. % of methane
- 5.0 mol. % of ethane It entered the stripping zone in the following conditions:
- Flow rate: 360 kmol/h
- Temperature: 15° C.
- Pressure: 7.0 barA.

The stripper was operated at a pressure of 5.0 barA.

The fuel gas stream exiting the stripping zone (8) had the following specifications:
- Flow rate: 465 kmol/h
- Temperature: 93° C.
- 8.4 mol. % of $CO_2$
- 0.1 mol. % of $H_2S$, and
- 625 mol. ppm of BTX (89% of the BTX entering the stripping zone).

This fuel gas stream exiting the stripping zone (8) was then passed through a heat exchanger and entered a second adsorption zone (12) at a temperature of 45° C.

In the second adsorption zone (12) the fuel gas stream exiting the stripping zone (8) contacted a methyldiethanolamine (MDEA) solution (28) introduced at a flow rate of 12 m³/h, at a temperature of 45° C. and a pressure of 4.0 barA.

The methyldiethanolamine (MDEA) solution is the same as the one used in the first absorption zone (2).

A fuel gas stream (13) exited the second absorption zone (12) at a flow rate of 406 kmol/h with the following composition:
- 9.1 mol. % of $CO_2$
- <100 mol. ppm of $H_2S$, and
- 680 mol. ppm of BTX (94% of the BTX entering the second absorption zone in stream 16 and about 7% of the BTX entering the process in stream 1).

The fuel gas stream (13) meets standards requirements for a combustible and can thus be used as a feed in the incinerator (33) and/or in the utility boilers where associated aromatic hydrocarbons (BTX) and $C_4^+$ aliphatic hydrocarbons, as well as remaining sulfur species, will be destructed.

The MDEA solution enriched in $H_2S$ (14) exiting the second absorption zone (12) was recycled to the stripping zone to supplement the MDEA solution enriched in $H_2S$ (4).

An MDEA solution depleted in BTX (9) exited the stripping zone (8) at a temperature of 89° C. and contained 11% of the BTX entering the stripping zone (a flow corresponding to about 1% of the BTX entering the process).

This MDEA solution depleted in BTX (9) was then introduced into a desorption zone (16) equipped with a boiler (18) operating at a temperature of 130° C. and a pressure of 2.4 barA.

The regenerated MDEA solution (17) leaving the bottom of the desorption zone (16) was sent back to the first adsorption zone (2) and to the second adsorption zone (12).

The lean acid gas depleted in BTX (21) exiting the desorption zone (16) was passed through a condenser (22) and a reflux drum (23).

The lean acid gas depleted in BTX (26) recovered at the end of the process of the invention had a temperature of 45° C. and a flow rate of 160 kmol/h. It had the following composition:
- 90.8 mol. % of $CO_2$
- 3.4 mol. % of $H_2S$, and
- 220 mol. ppm of BTX (1% of the BTX entering the process).
- 5.8 mol. % of $H_2O$.

The process of the present invention made it possible to decrease the BTX content of the lean acid gas treated of 99 mol. %. The treated lean acid gas was then suitable for a subsequent treatment in a sulfur recovery unit even with an $H_2S$ content much lower than 55 mol %.

The obtained acid gas was then treated by direct oxidation in 2 reactors (SmartSulf™ technology). This resulted in a sulfur recovery rate of 98%. 2 tons per day of bright yellow solid sulfur, reaching standards for sulfur recovery were recovered without further treatment.

The invention claimed is:

1. A process for the removal of aromatic hydrocarbons including benzene, toluene, ethyl benzene and xylene (BTX) and aliphatic hydrocarbons having 4 carbon atoms or more ($C_4^+$) from a lean acid gas containing $CO_2$ and less than 20 mol. % of $H_2S$, which process comprises:
   a) contacting the lean acid gas stream (1) with a $H_2S$-selective liquid absorbent solution (29) in a first absorption zone (2) to produce a gas stream depleted in H$_2$S (3) and containing CO$_2$, aromatic hydrocarbons and C$_4^+$ aliphatic hydrocarbons, and an absorbent solution enriched in H$_2$S (4), also containing co-absorbed C$_4^+$ aliphatic hydrocarbons, aromatic hydrocarbons and CO$_2$, b) introducing the absorbent solution enriched in H$_2$S (4) into a non-thermic stripping zone (8) where it is contacted with a stripping gas stream (7) to obtain an absorbent solution depleted in C$_4^+$ aliphatic hydrocarbons and aromatic hydrocarbons (9) and containing H$_2$S and CO$_2$ and a stripping gas stream enriched in aromatic hydrocarbons and C$_4^+$ aliphatic hydrocarbons (10), also containing H$_2$S and CO$_2$, c) contacting the stripping gas stream enriched in aromatic hydrocarbons and C$_4^+$ aliphatic hydrocarbons (10), also containing H$_2$S and CO$_2$ obtained in step b) with a H$_2$S-selective liquid absorbent solution (28) in a second absorption zone (12) to obtain a stripping gas stream depleted in H$_2$S and containing aromatic hydrocarbons, C$_4^+$ aliphatic hydrocarbons and CO$_2$ (13), and an absorbent solution enriched in H$_2$S (14) also containing co-absorbed aromatic hydrocarbons, C$_4^+$ aliphatic hydrocarbons and CO$_2$, passing the absorbent solution enriched in H$_2$S (14) exiting the second absorption zone through a heater (6) increasing its temperature, the temperature increase in the heater (6) being obtained by recirculating in the heater (6) at least a part of the H$_2$S-selective liquid absorbent solution (17) recovered from the desorption zone (16), and recycling the absorbent solution enriched in H$_2$S (14) to the non-thermic stripping zone (8) to supplement the absorbent enriched in H$_2$S (4), d) introducing the absorbent solution depleted in C$_4^+$ aliphatic hydrocarbons and aromatic hydrocarbons (9) obtained in step b) into a desorption zone (16) wherein the H$_2$S-selective liquid absorbent solution (17) is recovered and a lean acid gas containing H$_2$S and CO$_2$, depleted in C$_4^+$ aliphatic hydrocarbons and aromatic hydrocarbons (21) is produced.

2. The process according to claim 1, wherein the stripping gas (7) used in the stripping zone (8) is a combustible gas meeting standards requirements for a combustible, and is the combustible gas used to run the incinerator (33) and/or utility boilers.

3. The process according to claim 1 wherein, the lean acid gas stream (1) contains:
75 to 99.925 mol. % of CO$_2$,
250 mol. ppm to 20 mol. % of H$_2$S,
500 mol. ppm to 5 mol. % of C$_4^+$ aliphatic hydrocarbons and aromatic hydrocarbons,
the percentages being expressed on a dry basis, in moles, relative to the total moles of the lean acid gas.

4. The process according to claim 1, wherein the H$_2$S-selective liquid absorbent solution contains:
a chemical solvent
a physical solvent
or mixtures thereof.

5. The process according to claim 1, wherein the H$_2$S-selective liquid absorbent solution contains an amine.

6. The process according to claim 1, wherein the H$_2$S-selective liquid absorbent solution contains additives components capable of enhancing the selectivity of H$_2$S adsorption towards CO$_2$.

7. The process according to claim 1, wherein the absorptions in a) and c) are conducted:
at a temperature ranging from 10 to 100° C., and
at a pressure ranging from 1 to 8 barA.

8. The process according to claim 1, wherein the non-thermic stripping in step b) is conducted:
at a temperature ranging from 50 to 150° C., and
at a pressure ranging from 1 to 8 barA.

9. The process according to claim 1, wherein the absorbent solution depleted in C$_4^+$ aliphatic hydrocarbons and aromatic hydrocarbons (9) recovered from the stripping zone (8) passes through a heater (15) to increase its temperature before entering the desorption zone.

10. The process according to claim 9, wherein the temperature increase in the heater (15) is obtained by recirculating in the heater (15), at least a part of the regenerated liquid absorbent solution (17) recovered from the desorption zone (16).

11. The process according to claim 1, wherein lean acid gas depleted in aromatic hydrocarbons (21) or (26) is partially recycled to supplement the lean acid gas stream (1) and/or to supplement the stripping gas stream enriched in H$_2$S, CO$_2$ and aromatic hydrocarbons (10).

12. The process according to claim 1, further comprising:
a) contacting natural gas comprising methane (CH$_4$) and ethane (C$_2$H$_6$), CO$_2$, H$_2$S and C$_4^+$ aliphatic hydrocarbons and aromatic hydrocarbons, with a liquid absorbent solution in an absorption zone to produce a natural gas stream depleted in H$_2$S and CO$_2$ and comprising methane (CH$_4$) and ethane (C$_2$H$_6$), and an absorbent solution enriched in H$_2$S and CO$_2$, and also containing co-absorbed C$_4^+$ aliphatic hydrocarbons and aromatic hydrocarbons and,
b) introducing the absorbent solution enriched in H$_2$S and CO$_2$, and also containing co-absorbed C$_4^+$ aliphatic hydrocarbons and aromatic hydrocarbons into a desorption zone, recovering the liquid absorbent solution and producing the lean acid gas containing CO$_2$ and less than 20 mol. % of H$_2$S.

13. A process for sulfur recovery from a lean acid gas containing CO$_2$ and less than 20 mol. % of H$_2$S, which process comprises:
i) pretreating the lean acid gas stream (1) for the removal of aromatic hydrocarbons and C$_4^+$ aliphatic hydrocarbons in a process according to claim 1 to obtain a lean acid gas depleted in C$_4^+$ aliphatic hydrocarbons and aromatic hydrocarbons (21) or (26),
ii) mixing at least part of the pretreated lean acid gas depleted in C$_4^+$ aliphatic hydrocarbons and aromatic hydrocarbons (21) or (26) with an oxygen containing gas, for example air, to obtain a gas stream containing both H$_2$S and oxygen,
iii) optionally introducing part of the obtained lean acid gas depleted in aromatic hydrocarbons (21) or (26) and oxygen into a furnace to recover elemental sulfur,
iv) passing the lean acid gas depleted in C$_4^+$ aliphatic hydrocarbons and aromatic hydrocarbons recovered from ii) and optionally iii), after having optionally being preheated, into a catalytic reactor containing a catalyst system which catalyzes the direct oxidation of H$_2$S with oxygen and/or the Claus reaction of H$_2$S with sulfur dioxide (SO$_2$) so as to recover a lean acid gas stream depleted in H$_2$S and elemental sulfur.

14. The process according to claim 13, wherein iv) includes and/or is followed by:
iv.1 transferring the lean acid gas stream containing both H$_2$S and oxygen into a first section of a first reactor, after having optionally being preheated, which first section contains a non-cooled adiabatic bed containing a first catalyst which catalyzes the oxidation of H$_2$S with oxygen and the oxidation of $H_2S$ with sulfur dioxide, wherein the maximum temperature of the adiabatic bed is T1, iv.2 transferring the lean acid gas stream from the first section of the first reactor to a second section of the first reactor, which second section contains a second catalyst which can be different from the first catalyst and which second section is kept at a temperature T2 wherein T2≤T1 and T2 is higher than the dew point temperature of elemental sulfur, whereby a gas stream depleted in $H_2S$ is obtained, iv.3 transferring the gas stream depleted in $H_2S$ to a sulfur condenser to obtain a gas stream depleted in sulfur, iv.4 optionally preheating the gas stream depleted in sulfur iv.5 transferring the gas stream depleted in sulfur into the first section of a second reactor, which first section contains a non-cooled adiabatic bed containing the same catalyst as the first section of the first reactor, wherein the first section of the second reactor is operated at a temperature that is above the dew point of the elemental sulfur so that in the first section of the second reactor no elemental sulfur deposits as liquid or solid on the catalyst, iv.6 transferring the gas stream from the first section of the second reactor to the second section of the second reactor which contains the same catalyst as the second section of first reactor and which second section is kept at a temperature that is at or below the dew point of elemental sulfur so that in the second section of the second reactor elemental sulfur deposits as liquid or solid on the catalyst, and desulfurized gas stream meeting standard requirements for air emissions is obtained, iv.7 after a defined time switching the operation conditions of the first reactor and the second reactor and switching the gas flow simultaneously so that the previous second reactor becomes the new first reactor and the previous first reactor becomes the new second reactor.

15. The process according to claim 13, wherein the gas stream depleted in $H_2S$ (3), the stripping gas stream depleted in $H_2S$ (13) and/or the lean acid gas stream depleted in $H_2S$ (32) exiting the sulfur recovery unit in step iv) can then be either transferred to an incinerator (33) where it will be combusted to destruct remaining $H_2S$ as well as the aromatic hydrocarbons and $C_4^+$ aliphatic hydrocarbons contained therein, thus reaching the standards requirements for air emission or compressed, injected and disposed in an underground storage reservoir rather than being incinerated and released to the atmosphere.

16. The process according to claim 1, wherein the absorbent solution enriched in $H_2S$ (4) introduced into a non-thermic stripping zone (8) where it is contacted with a stripping gas stream (7) is a fuel gas.

17. The process according to claim 1, wherein said $H_2S$-selective liquid absorbent solution used in c) is identical to that used in a).

18. The process according to claim 1, wherein the stripping gas (7) used in the stripping zone (8) is a combustible gas meeting standards requirements for a combustible selecting from the group consisting of natural gas, hydrogen, and/or synthetic gas containing $H_2$ and CO.

\* \* \* \* \*